Patented Feb. 22, 1949

2,462,379

UNITED STATES PATENT OFFICE 2,462,379

PURIFICATION OF CRUDE SULFUR HEXAFLUORIDE

John F. Gall, Narberth, Pa., assignor to The Pennsylvania Salt Manufacturing Company, Philadelphia, Pa., a corporation of Pennsylvania No Drawing. Application June 28, 1947, Serial No. 757,917

8 Claims. (Cl. 23—205)

This invention relates to purification of crude sulfur hexafluoride.

The known procedures for making sulfur hexafluoride (formed by burning sulfur in a fluorine atmosphere) produce a gaseous reaction product which in addition to the desired sulfur hexafluoride contains such impurities as unreacted fluorine, hydrogen fluoride, unreacted sulfur, $S_2F_{10}$ and lower fluorides of sulfur. It is known that certain of these impurities, for example, the unreacted fluorine, the hydrogen fluoride and some of the lower fluorides of sulfur, may be removed by washing the crude sulfur hexafluoride reaction product with an aqueous liquid which is preferably alkaline. However, some of the lower fluorides of sulfur and particularly the $S_2F_{10}$ are not satisfactorily removed by such a wash.

I have now discovered a procedure whereby the above-named impurities may be removed from sulfur hexafluoride substantially completely in a simple and efficient sequence of operations. The purification process of my invention involves treating sulfur hexafluoride which contains as impurities acid reacting gases such as fluorine, hydrogen fluoride or both, and also $S_2F_{10}$ and possible other lower fluorides of sulfur, to at least three successive treatments. In the first stage of my purification process the crude sulfur hexafluoride is washed with an aqueous liquid which preferably contains in solution an alkali such as KOH, NaOH, or the like, to remove the water-soluble impurities, particularly those of acid reaction. In the second stage of my purification process the washed crude sulfur hexafluoride material is subjected to a temperature of at least 250° C. and preferably 275 to 325° C. whereupon the compound $S_2F_{10}$ is decomposed to form additional $SF_6$ together with such lower fluorides of sulfur as $SF_4$. The gas which has thus been subjected to heat is then subjected to the third stage of my purification process which involves washing the gas again with a liquid of the same character of that used in the first stage of treatment.

I have found that the purification procedure that involves subjecting the crude sulfur hexafluoride to the above described wash with an aqueous liquid, preferably an alkaline aqueous liquid, both before and after the gas is subjected to a temperature of at least 250° C., is peculiarly effective to remove the impurities present in crude sulfur hexafluorides substantially completely.

In a preferred method of carrying out the process of my invention a crude sulfur hexafluoride gas, produced for example as described in my copending application Serial No. 757,913, filed the same day as this application, entitled Production of sulfur hexafluoride, is passed into the first washing tower which may be constructed for example of copper, nickel, Monel alloys or any material resistant to the combined action of aqueous fluorides, acids and oxidizing agents. The tower is packed with a material of similar resistance.

The wash liquor in this tower may be either water or an aqueous solution of an alkali such as potassium hydroxide, sodium hydroxide, sodium carbonate, calcium hydroxide or the like. Concentrations of alkali ranging from around 0 to 50% by weight are convenient. A preferred wash liquor is a 30 to 35% by weight solution of potassium hydroxide. This readily removes water-soluble impurities from the crude gas, particularly acid reacting water-soluble impurities such as any unreacted fluorine that may be present, hydrogen fluoride and lower fluorides of sulfur such as $SF_4$, or $S_2F_2$, if these are present. Entrained unreacted sulfur vapor or particles, if present, are also removed in this wash.

The gas is then passed through a decomposing chamber which is supplied with sufficient heat to bring the gas to a temperature of 250 to 400° C. preferably 275 to 325° C. Such temperatures are effective to decompose the particular impurity $S_2F_{10}$ into $SF_6$ and lower sulfur florides such as $SF_4$. This chamber may be constructed of copper, Monel alloys or nickel and may be packed with materials formed from these metals, or with carbon or bauxite. I prefer to employ for this decomposer chamber a copper tube packed with lumps of carbon.

The gas leaving the decomposer chamber is then passed on to a second scrubber. If desired, the gas may first be cooled somewhat, for example by a cooling jacket surrounding the conduit carrying the gas. The second scrubber is of a construction similar to the first scrubber above described and is supplied with a wash liquor of the same character as that described in connection with the first scrubber. Preferably a wash liquor consisting of a 30 to 35% solution of potassium hydroxide is also employed in the second scrubber. In this scrubber the $SF_4$ formed by decomposition of the $S_2F_{10}$ is substantially completely removed from the gas.

The resulting gas contains no impurities except possibly atmospheric gases from accidental contamination and, of course, some water vapor. The gas may be stored in this condition over water or may be dried and is then ready for packaging and use. Concentrated sulfuric acid, refrigeration or other conventional means may be used to dry the sulfur hexafluoride, which is an inert gas. The gas may be then condensed directly as a solid or a liquid into pressure cylinders depending upon the temperature and pressure employed.

The following example is illustrative of the process of my invention.

Sulfur was burned in a fluorine atmosphere as described in my copending application above referred to. The resulting gaseous reaction product continuously withdrawn contained, for a given unit of time, 2.44 pounds of sulfur hexafluoride, 1.3 pounds of hydrogen fluoride, .05 pound of $S_2F_{10}$, .40 pound of $S_2F_2$ and other lower fluorides of sulfur, and no unreacted fluorine. This gas was passed to the first scrubber in which it was washed with a 30% aqueous solution of potassium hydroxide. The scrubber was constructed of copper pipe packed with copper turnings over which the potassium hydroxide solution was trickled. Rates of flow were such as to employ 1.6 pounds of potassium hydroxide for the quantities of gas above given.

The gas withdrawn from the first scrubber during the reference unit of time contained 2.44 pounds of sulfur hexafluoride, .05 pound of $S_2F_{10}$ and .03 pound of water. This gas was passed to a decomposer consisting of a copper pipe packed with carbon lumps and provided with an electrical heating coil to maintain a temperature of 300° C.

The gas effluent from the decomposer, during the unit of time referred to, contained 2.48 pounds of sulfur hexafluoride, .02 pound of sulfur tetrafluoride and .03 pound of water. This effluent gas was cooled to about 30° C. by passing it through an air-cooled coil.

The gas thus treated was again contacted with a 30% potassium hydroxide solution in a second scrubber of the same construction as the first scrubber. In this scrubber .06 pound of potassium hydroxide were employed for the amounts of gas above indicated. This scrubber removed the sulfur tetrafluoride.

The gas effluent from the second scrubber, during the unit of time, contained 2.48 pounds of sulfur hexafluoride and .93 pound of water. This gas was passed to an accumulator where it was temporarily stored over water.

The wet sulfur hexafluoride gas was withdrawn from this storage as required for use or packaging. The wet gas was first passed through a third scrubber constructed of steel or of lead packed with material inert to sulfuric acid. In this scrubber the gas was washed with 96 to 98% sulfuric acid to remove most of the water. The gas was then subjected to intensive drying by passing it through a bed of activated alumina.

The dried pure sulfur hexafluoride thus produced may be compressed to 200 pounds per square inch, chilled to a temperature of 0° C. and run as a liquid into pressure cylinders.

Since many modifications are possible in the process of my invention as above described without departing from the scope of the invention, it is intended that the above description of my invention should be interpreted as illustrative, and the invention is not to be limited except as set forth in the claims which follow.

I claim:

1. A process for purification of crude sulfur hexafluoride containing as impurities at least one water-soluble acid reacting constituent and the lower fluoride of sulfur $S_2F_{10}$, which process comprises first washing the crude gas with an aqueous wash liquor, thereafter heating the gas thus washed to a temperature above about 250° C., and thereafter again washing the gas with an aqueous wash liquor.

2. A process for purification of crude sulfur hexafluoride containing as impurities at least one water-soluble acid reacting constituent and the lower fluoride of sulfur $S_2F_{10}$, which process comprises first washing the crude gas with an aqueous wash liquor, thereafter heating the gas thus washed to a temperature within the range of about 250 to 400° C., and thereafter again washing the gas with an aqueous wash liquor.

3. A process for purification of crude sulfur hexafluoride containing as impurities at least one water-soluble acid reacting constituent and the lower fluoride of sulfur $S_2F_{10}$, which process comprises first washing the crude gas with an aqueous wash liquor containing from 0 to 50% of an alkali, thereafter heating the gas thus washed to a temperature within the range of about 250 to 400° C., and thereafter again washing the gas with an aqueous wash liquor containing from 0 to 50% of an alkali.

4. A process for purification of crude sulfur hexafluoride containing as impurities at least one water-soluble acid reacting constituent and the lower fluoride of sulfur $S_2F_{10}$, which process comprises first washing the crude gas with an aqueous wash liquor containing from 0 to 50% of a strong alkali, thereafter heating the gas thus washed to a temperature within the range of about 275 to 325° C., and thereafter again washing the gas with an aqueous wash liquor containing from 0 to 50% of strong alkali.

5. A process for purification of crude sulfur hexafluoride containing as impurities water-soluble acid reacting constituents and lower fluorides of sulfur including $S_2F_{10}$, which process comprises first washing the crude gas with an aqueous wash liquor containing from 0 to 50% of a strong alkali, thereafter heating the gas thus washed to a temperature within the range of about 275 to 325° C., thereafter again washing the gas with an aqueous wash liquor containing from 0 to 50% of strong alkali, and drying the gas from the last wash step.

6. A process for purification of crude sulfur hexafluoride containing as impurities at least one water-soluble acid reacting constituent and lower fluorides of sulfur including $S_2F_{10}$, which process comprises first washing the crude gas with an aqueous wash liquor containing from about 30 to 35% by weight of KOH, thereafter heating the gas thus washed to a temperature within the range of about 275 to 325° C., thereafter again washing the gas with an aqueous wash liquor containing from about 30 to 35% by weight of KOH, and drying the gas from the last wash step.

7. A process for purification of crude sulfur hexafluoride containing as impurities at least one water-soluble acid reacting constituent and the lower fluoride of sulfur $S_2F_{10}$, which process comprises first washing the crude gas with an aqueous wash liquor, thereafter heating the gas to a relatively high temperature so as to decompose said $S_2F_{10}$, and thereafter again washing the gas with an aqueous wash liquor.

8. A process for purification of crude sulfur hexafluoride containing as impurities at least one water-soluble acid reacting constituent and the lower fluoride of sulfur $S_2F_{10}$, which process comprises first washing the crude gas with an aqueous wash liquor, thereafter heating the gas thus washed to a temperature above about 250° C., thereafter again washing the gas with an aqueous wash liquor, removing a major portion of moisture from the gas after said second washing by a preliminary drying step and thereafter passing the gas over activated alumina to remove substantially all remaining moisture therefrom.

JOHN F. GALL.

No references cited.